United States Patent [19]

Begrich et al.

[11] Patent Number: 4,504,273
[45] Date of Patent: Mar. 12, 1985

[54] REACTIVE DYES, PROCESS FOR THEIR PREPARATION AND USE THEREOF

[75] Inventors: Rainer Begrich, Rheinfelden, Switzerland; Jean-Francois Landré, Riedisheim, France

[73] Assignee: Ciba-Geigy Corporation, Ardsley, N.Y.

[21] Appl. No.: 525,368

[22] Filed: Aug. 22, 1983

[30] Foreign Application Priority Data

Aug. 25, 1982 [CH] Switzerland ..................... 5055/82

[51] Int. Cl.³ .................. C09B 62/08; D06P 3/66; D06P 1/38
[52] U.S. Cl. ........................................ 8/549; 8/684; 8/691; 8/917; 8/918; 544/191; 548/146; 548/152; 534/635
[58] Field of Search ............... 260/153, 158; 8/549, 8/684, 691; 544/191

[56] References Cited

U.S. PATENT DOCUMENTS

| | | | |
|---|---|---|---|
| 2,875,192 | 2/1959 | Gunst | 260/153 |
| 3,905,950 | 9/1975 | Crabtree | 260/153 |
| 3,936,436 | 2/1976 | Berrie et al. | 260/153 |
| 4,039,523 | 8/1977 | Hegar | 260/153 |
| 4,207,233 | 6/1980 | Seybold et al. | 260/158 |
| 4,261,889 | 4/1981 | Seiler et al. | 260/153 |
| 4,283,331 | 8/1981 | Seitz et al. | 260/153 |
| 4,299,764 | 11/1981 | Jager | 260/153 |

FOREIGN PATENT DOCUMENTS

| | | |
|---|---|---|
| 299331 | 1/1930 | United Kingdom . |
| 1271226 | 4/1972 | United Kingdom . |
| 1348641 | 3/1974 | United Kingdom . |
| 2028360 | 3/1980 | United Kingdom . |

*Primary Examiner*—A. Lionel Clingman
*Attorney, Agent, or Firm*—Edward McC. Roberts

[57] ABSTRACT

The invention relates to reactive dyes of the formula

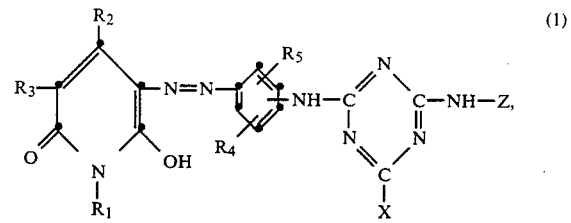

wherein $R_1$ is hydrogen or unsubstituted or substituted $C_1$–$C_4$ alkyl or phenyl, $R_2$ is hydrogen or unsubstituted or substituted $C_1$–$C_4$ alkyl, $R_3$ is hydrogen, cyano, carbamoyl or sulfomethyl, $R_4$ and $R_5$ are each independently hydrogen, $C_1$–$C_4$ alkyl, $C_1$–$C_4$ alkoxy, halogen, carboxy or sulfo, X is fluorine, chlorine or bromine, and Z is an unsubstituted or substituted benzthiazolyl-(2)-phenyl radical, which are suitable for dyeing or printing cellulosic fibers and produce brilliant greenish yellow dyeings.

13 Claims, No Drawings

REACTIVE DYES, PROCESS FOR THEIR PREPARATION AND USE THEREOF

Reactive dyes have long been widely used for dyeing and printing textiles made from fibre materials and at the present time there are available a large number of useful reactive dyes with different properties and for different utilities. In view of the ever more exacting demands made of reactive dyeings with respect to economy, application technology and fastness standards, the present state of the art is often not entirely satisfactory. In particular, many reactive dyes do not have a sufficient fixation yield.

It is therefore frequently observed that the degree of fixation is too low and the difference between degree of exhaustion and degree of fixation is too great (high soap loss), so that a substantial proportion of the reactive dye is lost in the dyeing procedure. There is consequently a need to provide improved reactive dyes.

It is the object of the present invention to provide novel reactive dyes which have high reactivity, which can be dyed with high fixation yield, and which are suitable in particular for the exhaust process, especially at high dyeing temperatures, and which dye cellulosic fibre material in light- and wetfast yellow to greenish yellow shades. It has been found that this object is accomplished with the novel reactive dyes of this invention, defined below.

The present invention provides reactive dyes of the formula

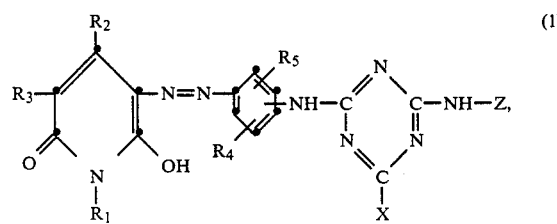

wherein $R_1$ is hydrogen or unsubstituted or substituted $C_1$-$C_4$alkyl or phenyl, $R_2$ is hydrogen or unsubstituted or substituted $C_1$-$C_4$alkyl, $R_3$ is hydrogen, cyano, carbamoyl or sulfomethyl, $R_4$ and $R_5$ are each independently hydrogen, $C_1$-$C_4$alkyl, $C_1$-$C_4$alkoxy, halogen, carboxy or sulfo, X is fluorine, chlorine or bromine, and Z is an unsubstituted or substituted benzthiazolyl-(2)-phenyl radical.

$R_1$ and $R_2$ as $C_1$-$C_4$-alkyl in formula (1) is a straight chain or branched alkyl radical which may also be substituted, for example by halogen, hydroxy, cyano, amino, sulfo or sulfato. Typical examples of such radicals are: methyl, ethyl, propyl, isopropyl, butyl, isobutyl, sec-butyl, tert-butyl, β-chloroethyl, β-hydroxyethyl, β-hydroxybutyl, β-cyanoethyl, β-aminoethyl, sulfomethyl, β-sulfoethyl and β-sulfatoethyl. If $R_1$ is a phenyl radical it may also be further substituted, for example by methyl, methoxy, chlorine or sulfo. Examples of such radicals are: 4'-methylphenyl, 4'-methoxyphenyl, 4'-chlorophenyl and 4'-methyl-3'-sulfophenyl.

Possible substituents $R_4$ and $R_5$ are e.g. methyl, ethyl, propyl, isopropyl, butyl, isobutyl, sec-butyl, tert-butyl, methoxy, ethoxy, propoxy, isopropoxy, butoxy, isobutoxy, sec-butoxy, tert-butoxy, fluorine, chlorine and bromine. Preferably at least one of the substituents $R_4$ and $R_5$ is a sulfo group. Suitable further substituents are in particular methyl, methoxy, chlorine or sulfo.

Suitable substituents at the benzthiazolyl-(2)-phenyl radical are preferably methyl and sulfo which may be linked to the benzthiazole nucleus or to the phenyl ring.

Preferred subgroups of reactive dyes of the formula (1) are:

(a) Reactive dyes of the formula

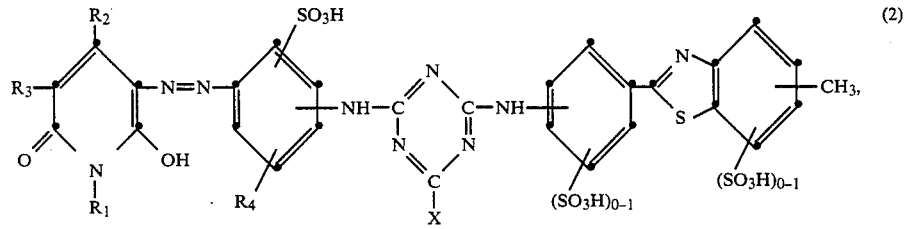

wherein $R_1$, $R_2$, $R_3$ and X are as defined for formula (1) and $R_4$ is hydrogen, methyl, methoxy, chlorine or sulfo.

(b) Reactive dyes according to (a), wherein $R_1$ is hydrogen or unsubstituted or substituted $C_1$-$C_4$alkyl, $R_2$ is $C_1$-$C_4$alkyl, and $R_3$, $R_4$ and X are as defined in (a).

(c) Reactive dyes according to (b), wherein $R_1$ is hydrogen, methyl, ethyl or sulfoethyl, $R_2$ is methyl, and $R_3$, $R_4$ and X are as defined in (b).

(d) Reactive dyes according to (c), wherein $R_3$ is carbamoyl, and $R_1$, $R_2$, $R_4$ and X are as defined in (c).

(e) Reactive dyes according to (b), wherein $R_3$ is carbamoyl, and $R_1$, $R_2$, $R_4$ and X are as defined in (b).

(f) Reactive dyes according to (e) of the formula

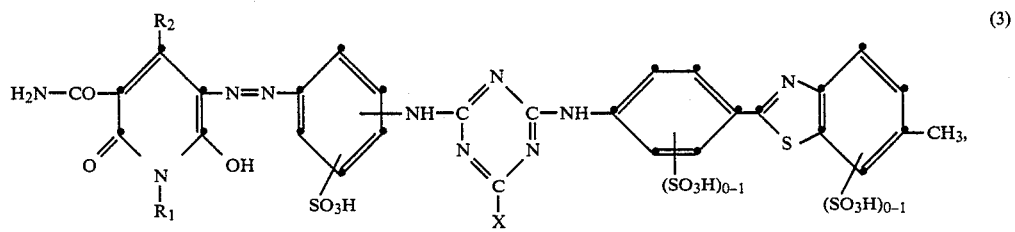

wherein $R_1$ is hydrogen or $C_1$-$C_4$alkyl, $R_2$ is $C_1$-$C_4$alkyl, and X is fluorine, chlorine or bromine.

(g) The reactive dye according to (d) or (f) of the formula

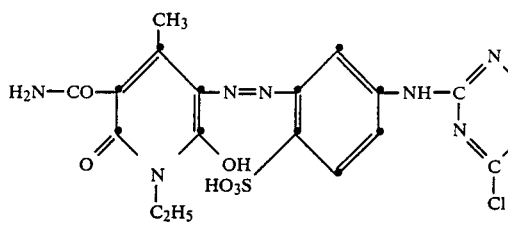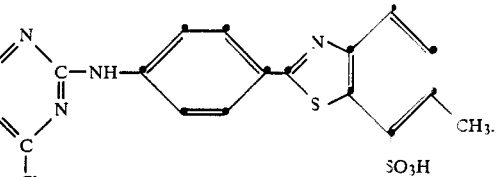

(4)

The dyes of formula (1) are fibre-reactive, as they contain at least one removable halogen atom at the s-triazine ring.

By fibre-reactive compounds are meant those compounds which are able to react with the hydroxy groups of cellulose or with the amino groups of natural or synthetic polyamides to form covalent chemical bonds.

The process for obtaining the reactive dyes of the formula (1) comprises reacting, in any order, 6-hydroxypyrid-2-ones of the formula

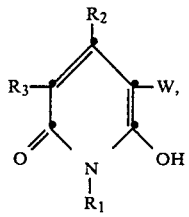  (5)

wherein W is hydrogen or carbamoyl, diaminobenzenes of the formula

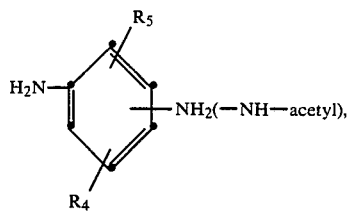  (6)

2,4,6-trihalo-s-triazines of the formula

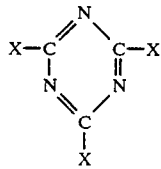  (7)

and benzthiazolyl-(2)-phenylamines of the formula $H_2N-Z$  (8)

by diazotisation, coupling and condensation.

If necessary or desired, the corresponding aminoacetylaminobenzene compound is used instead of a diaminobenzene of the formula (6) and the acetyl radical is removed again by saponification after diazotisation and coupling.

If W is carbamoyl in the 6-hydroxyprid-2-one of the formula (5), then this carbamoyl radical is removed during the coupling reaction.

As the process steps referred to above can be carried out in varying sequence and, if desired, in some cases can be carried out simultaneously, different variants of the process are possible. The starting materials to be used for each partial reaction can be inferred from formula (1). In general, the reaction is carried out stepwise in succession and the sequence of the simple reactions of the individual reactants of the formulae (5) to (8) can be freely chosen. In this connection, it depends on the structure of the starting materials which of the possible process variants give the best results or under which conditions, e.g. at what condensation temperature, the reaction shall most conveniently be carried out.

Important process variants comprise:

(1) condensing a 2,4,6-trihalo-s-triazine of the formula (7) with a diaminobenzene of the formula (6), diazotising the primary condensation product and coupling the diazonium compound to a 6-hydroxypyrid-2-one of the formula (5), and finally replacing a halogen atom in the s-triazine radical with an —NH—Z radical by condensation with a benzthiazolyl-(2)-phenylamine of the formula (8);

(2) diazotising a diaminobenzene of the formula (6) or a corresponding aminoacetylaminobenzene compound and coupling the diazonium compound to a 6-hydroxypyrid-2-one of the formula (5) (and, if desired, removing the acetyl radical by saponification), condensing the azo compound with a 2,4,6-trihalo-s-triazine of the formula (7), and condensing the monocondensation product with a benzthiazolyl-(2)-phenylamine of the formula (8);

(3) condensing a diaminobenzene of the formula (6) with a 2,4,6-trihalo-s-triazine of the formula (7), condensing the primary condensation product with a benzthiazolyl-(2)-phenylamine of the formula (8), diazotising the obtained secondary condensation product and coupling the diazonium compound to a 6-hydroxypyrid-2-one of the formula (5);

(4) diazotising a diaminobenzene of the formula (6), or a corresponding aminoacetylaminobenzene compound and coupling the diazonium compound to a 6-hydroxypyrid-2-one of the formula (5) (and, if desired, removing the acetyl radical by saponification), in addition condensing a 2,4,6-trihalo-s-triazine of the formula (7) and a benzthiazolyl-(2)-phenylamine of the formula (8) and condensing both intermediates with each other;

(5) condensing a 2,4,6-trihalo-s-triazine of the formula (7) with a benzthiazolyl-(2)-phenylamine of the formula (8), condensing the mono-condensation product with a diaminobenzene of the formula (6), diazotising the obtained secondary condensation product and coupling the diazonium compound to a 6-hydroxypyrid-2-one of the formula (5).

The preferred process for obtaining the reactive dye of the formula (4) comprises diazotising 1-amino-3-acetylaminobenzene-6-sulfonic acid and coupling the diazonium compound to 1-ethyl-4-methyl-5-carbamoyl-6-hydroxypyrid-2-one, removing the acetyl group by saponification, condensing the aminomonoazo compound so obtained with cyanuric chloride and condensing the obtained primary condensation product with dehydrothio-p-toluidine-7-sulfonic acid, to obtain the reactive dye of the formula (4), or diazotising 1-amino-3-acetylaminobenzene-6-sulfonic acid and coupling the diazonium compound to 1-ethyl-4-methyl-5-carbamoyl-6-hydroxypyrid-2-one and removing the acetyl group by saponification, and also condensing cyanuric chloride with dehydrothio-p-toluidine-7-sulfonic acid and condensing both intermediates with each other.

In the following Examples, the preparation of the intermediates is not described in every case; however, it is clearly evident from what has been stated above.

As starting materials which can be used for the production of the fibre-reactive azo dyes of the formula (1) the following compounds may be mentioned:

6-Hydroxypyrid-2-ones of the formula (5)

1-ethyl-3-carbamoyl-4-methyl-6-hydroxypyrid-2-one,
1,4-dimethyl-3-carbamoyl-6-hydroxypyrid-2-one,
1-ethyl-3-sulfomethyl-4-methyl-6-hydroxypyrid-2-one,
1-phenyl-3-sulfomethyl-4-methyl-6-hydroxypyrid-2-one,
3-sulfomethyl-4-methyl-2,6-dihydroxypyridine,
3-cyano-4-methyl-2,6-dihydroxypyridine,
1-ethyl-3-cyano-4-methyl-6-hydroxyprid-2-one,
3-carbamoyl-4-methyl-2,6-dihydroxypyridine,
1-ethyl-3-sulfomethyl-4-methyl-5-carbamoyl-6-hydroxypyrid-2-one,
3-sulfomethyl-4-methyl-5-carbamoyl-2,6-dihydroxypyridine,
1-ethyl-3-cyano-4-methyl-5-carbamoyl-6-hydroxypyrid-2-one,
1-ethyl-4-methyl-2,6-dihydroxypyridine,
1-sulfoethyl-3-carbamoyl-4-methyl-6-hydroxypyrid-2-one,
4-methyl-2,6-dihydroxypyridine,
1,4-dimethyl-6-hydroxypyrid-2-one,
1-n-propyl- or -isopropyl-4-methyl-6-hydroxypyrid-2-one,
1-n-butyl-4-methyl-6-hydroxypyrid-2-one,
1-n-propyl- or -isopropyl-3-carbamoyl-4-methyl-6-hydroxypyrid-2-one,
1-n-butyl-3-carbamoyl-4-methyl-6-hydroxypyrid-2one.

Diaminobenzenes of the formula (6)

1,3-diaminobenzene,
1,4-diaminobenzene,
1,3-diamino-4-chlorobenzene,
1,3-diamino-4-methylbenzene,
1,3-diamino-4-ethylbenzene,
1,3-diamino-4-methoxybenzene,
1,3-diamino-4-ethoxybenzene,
1,4-diamino-2-methylbenzene,
1,4-diamino-2-methoxybenzene,
1,4-diamino-2-ethoxybenzene,
1,4-diamino-2-chlorobenzene,
1,4-diamino-2,5-dimethylbenzene,
1,4-diamino-2,5-diethylbenzene,
1,4-diamino-2-methyl-5-methoxybenzene,
1,4-diamino-2,5-dimethoxybenzene,
1,4-diamino-2,5-diethoxybenzene,
1,3-diamino-4-nitrobenzene,
1-amino-3-acetylaminobenzene (subsequently saponified),
1-amino-3-acetylamino-6-methylbenzene (subsequently saponified),
1-amino-3-acetylamino-6-methoxybenzene (subsequently saponified)
1-amino-3-acetylaminobenzene-4-sulfonic acid (subsequently saponified),
1-amino-3-acetylaminobenzene-6-sulfonic acid (subsequently saponified),
1-amino-3-acetylamino-4-methylbenzene-6-sulfonic acid (subsequently saponified), 1-amino-4-acetylaminobenzene-2-sulfonic acid (subsequently saponified), 1-amino-3-acetylamino-6-methylbenzene-4-sulfonic acid (subsequently saponified), 1-amino-3-acetylamino-6-methoxybenzene-4-sulfonic acid (subsequently saponified),
1,4-diaminobenzene-2-sulfonic acid,
1,4-diaminobenzene-2,5-sulfonic acid,
1,4-diaminobenzene-2,6-disulfonic acid,
1,3-diaminobenzene-4-sulfonic acid,
1,3-diaminobenzene-4,6-disulfonic acid,
1,4-diamino-2-chlorobenzene-5-sulfonic acid,
1,4-diamino-2-methylbenzene-5-sulfonic acid,
1,5-diamino-6-methylbenzene-3-sulfonic acid, 1,3-diamino-6-methylbenzene-4-sulfonic acid, 1,4-diamino-6-chlorobenzene-2-sulfonic acid,
1,4-diaminobenzene-2-carboxylic acid, 1,3-diaminobenzene-4-carboxylic acid, 1,2-diaminobenzene-4-carboxylic acid, 1,3-diaminobenzene-5-carboxylic acid.

2,4,6-Trihalo-s-triazines of the formula (7)

2,4,6-trifluoro-s-triazine (cyanuric fluoride), 2,4,6-trichloro-s-triazine (cyanuric chloride) 2,4,6-tribromo-s-triazine (cyanuric bromide).

Benzthiazolyl-(2)-phenylamines of the formula (8)

2-o-aminophenyl-4-methylbenzthiazole (dehydrothio-o-toluidine),
2-p-aminophenyl-6-methylbenzthiazole (dehydrothio-p-toluidine),
2-p-aminophenyl-6-methyl-7-sulfobenzthiazole (dehydrothio-p-toluidine-7-sulfonic acid), 2-(p-amino-m-sulfo)phenyl-6-methylbenzthiazole,
(2-p-amino-m-sulfo)phenyl-6-methyl-7-sulfobenzthiazole, 2-p-aminophenylbenzthiazole, dehydrothioxylidine, dehydrothioxylidinesulfonic acid, primulin-sulfonic acid.

The diazotisation of the diaminobenzenes of the formula (6) is normally carried out by treatment with nitrous acid in an aqueous solution of mineral acid at low temperature, and the coupling to the 6-hydroxypyrid-2-one of the formula (5) is carried out at weakly acid, neutral or weakly alkaline pH values.

The condensation reactions of the 2,4,6-trihalo-s-triazine of the formula (7) with the diaminobenzenes of the formula (6) or, if coupling is effected beforehand, with the aminomonoazo compounds, is preferable carried out in aqueous solution or suspension, at low temperature, preferably in the range from 0° to 10° C. and at a weakly acid, neutral or weakly alkaline pH value. It is advantageous to neutralise the hydrogen fluoride set free during the condensation by the continuous addition of an aqueous alkali metal hydroxide, carbonate or bicarbonate. For the further reaction of the halotriazine compounds so obtained or for the reaction of the 2,4,6-trihalo-s-triazine with the compounds of the formula (8), the free amines or salts thereof, preferably in the form of the hydrochloride, are used. The reaction is carried out in the temperature range from about 0° to 50° C., preferably from 5° to 25° C., with the addition of an acid acceptor, preferably sodium carbonate, in the pH range from 2 to 8, preferably from 5 to 6.5.

The condensation of the halotriazine with a compound of the formula (8) can be carried out before or after the condensation of the halotriazine with a diamine of the formula (6). The condensation of the halotriazine with an amine of the formula (8) is preferably carried out in aqueous solution or suspension, at low temperature and at a weakly acid to neutral pH value. In this reaction too, the hydrogen fluoride set free during the condensation is conveniently neutralised by the continuous addition of an aqueous alkali metal hydroxide, carbonate or bicarbonate.

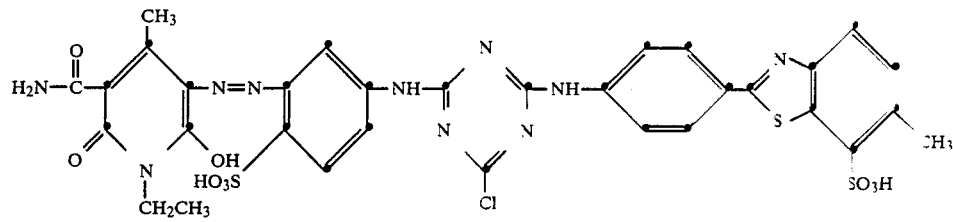

The reactive dyes of the formula (1) are suitable for dyeing and printing a very wide variety of materials, such as silk, leather, wool, polyamide fibres and polyurethane, and especially cellulosic materials of fibrous structure, such as linen, cellulose, regenerated cellulose and, in particular, cotton. They are suitable for the exhaust process, especially at elevated temperatures, and for dyeing by the pad-dyeing process, in which the goods are impregnated with aqueous and, if appropriate, also with salt-containing dye solutions, and the dyes are fixed after treatment with alkali or in the presence of alkali, with or without the application of heat. They are also suitable for printing, in particular on cotton, and also for printing nitrogen-containing fibres, for example wool, silk or blends containing wool.

It is advisable to rinse the dyeings and prints thoroughly with cold and hot water, if appropriate with the addition of an agent which acts as a dispersant and promotes the diffusion of non-fixed dye.

The reactive dyes of the formula (1) are characterised by high reactivity and good fixation. They produce dyeings of good wet- and lightfastness properties and of excellent tinctorial strength and excellent fibre/dye bond stability, both in acid and in alkaline medium.

Compared with the azopyridone reactive dyes of German Offenlegungsschrift No. 29 27 718, the reactive dyes of the formula (1) are distinguished by a higher dyeing yield on cellulose fibres and have very good water-solubility.

In the following Examples parts and percentages are by weight.

EXAMPLE 1

39,5 parts of 1-ethyl-3-carbamoyl-4-methyl-5-(5'-amino-2'-sulfophenylazo)-6-hydroxypyrid-2-one (obtained by coupling 3-aminoacetanilide-4-sulfonic acid to 1-ethyl-3-carbamoyl-4-methyl-6-hydroxypyrid-2-one and subsequent saponification) are dissolved at pH 7 in 500 parts of water with sodium hydroxide and the solution is cooled to 0°–5° C. by addition of ice. Then 18.4 parts of cyanuric chloride are tipped in and the pH is subsequently kept at 4–5 with sodium hydroxide solution. After 20 to 30 minutes, a neutral solution of 32 parts of dehydro-p-toluidine-7-sulfonic acid in 250 parts of water are poured in and the pH is kept at 6–7 by further addition of sodium hydroxide while simultaneously raising the temperature to 40°–45° C. The batch is stirred for about 2 hours, then clarified by filtration and evaporated to dryness, affording the dye of the formula as a yellow powder which dyes cotton in brilliant, slightly greenish yellow shades of very good fastness properties.

EXAMPLE 2

19 parts of cyanuric chloride are stirred with 500 parts of ice until a fine, uniform suspension is obtained. A neutral solution of 32 parts of dehydrothio-p-toluidine-7-sulfonic acid in 250 parts of water is slowly run in while simultaneously keeping the pH at 4–5 with sodium hydroxide solution. The batch is stirred briefly and then a neutral solution of 39.5 parts of 1-ethyl-3-carbamoyl-4-methyl-5-(5'-amino-2'-sulfophenylazo)-6-hydroxypyrid-2-one in 500 parts of water is tipped in and the reaction mixture is warmed to 40° C. while keeping the pH at 6.5–7 by dropwise addition of sodium hydroxide solution. The reaction is complete after about 3 hours. The dye so obtained is identical with that of Example 1.

EXAMPLE 3

The dye described in Example 1 can also be obtained as follows:

18.8 parts of 1,3-phenylenediamine-4-sulfonic acid are dissolved at pH 7 and 0° C. in 250 parts of water and 18.4 parts of cyanuric chloride are tipped into the solution. The mixture is stirred at 0°–5° C. while keeping the pH at 4–5 by the dropwise addition of 52 parts of 2N sodium hydroxide solution. As soon as no more alkali is taken up, a neutral solution of 32 parts of dehydrothio-p-toluidine-7-sulfonic acid in 250 parts of water is added to the reaction mixture, which is warmed to 40° C. while keeping the pH at 7 to 8 by the further addition of sodium hydroxide solution. When the condensation is complete, the reaction mixture is cooled to 0° C., then acidified with 25 parts of concentrated hydrochloric acid and diazotisation is carried out with 25 parts of 4N sodium nitrite solution. The diazo solution is stirred briefly and any excess nitrite is destroyed with sulfamic acid. A neutral solution of 19.6 parts of 1-ethyl-3-carbamoyl-4-methyl-6-hydroxypyrid-2-one in 100 parts of water is then run in. The pH is adjusted initially to 4.5 by addition of sodium hydroxide solution, then raised to 7 when the coupling is complete. The dye is precipitated by adding the coupling solution dropwise to a suspension of 480 g of sodium chloride in 400 ml of water.

EXAMPLE 4

18.8 parts of 1,3-phenylenediamine-4-sulfonic acid are dissolved at pH 7 and 0° C. in 250 parts of water and 18.4 parts of cyanuric chloride are tipped into the solution. The mixture is stirred at 0°–5° C. while keeping the pH at 4–5 by the dropwise addition of 52 parts of 2N sodium hydroxide solution. When the condensation is complete, the reaction mixture is adjusted to pH 7 and 25 parts of 4N sodium nitrite solution is added. The solution is then added dropwise to a mixture of 25 parts of concentrated hydrochloric acid and 100 parts of ice. After diazotisation, the reaction mixture is stirred briefly and any excess of nitrite is destroyed. A neutral solution of 19.6 parts of 1-ethyl-3-carbamoyl-4-methyl-6-hydroxypyrid-2-one in 100 parts of water is then run in. The pH is adjusted initially to 4.5 by addition of sodium hydroxide solution, then raised to 7 when the coupling is complete. Then a neutral solution of 32 parts of dehydrothio-p-toluidine-7-sulfonic acid in 150 parts of water is added. The reaction mixture is slowly warmed to 40° C. while keeping the pH at 7–8 by the dropwise addition of sodium hydroxide solution. When the condensation is complete, the reaction mixture is clarified by filtration and evaporated. The dye so obtained is identical with the dye obtained in Example 1.

Further greenish yellow to yellow reactive dyes having excellent fastness properties are obtained by carrying out the procedures described in the foregoing Examples 1–4, but using the coupling components, diazo components, halotriazines and aminophenylbenzthiazoles or intermediates prepared therefrom, indicated in the following table.

| No. | Coupling component | Diazo component | Halotriazine | Aminophenylbenzthiazole |
|---|---|---|---|---|
| 6 | CH₃, H₂N-C(=O), O, N-CH₂CH₃SO₃H, OH | H₂N, NH₂, SO₃H (benzene) | Cl, N, N, Cl, N, Cl (triazine) | H₂N–(phenyl)–benzthiazole–CH₃, SO₃H |
| 7 | CH₃, H₂N-C(=O), O, N-CH₃, OH | H₂N, NH₂, SO₃H | F, N, N, F, N, F | HO₃S, H₂N–(phenyl)–benzthiazole–CH₃, SO₃H |
| 8 | CH₃, HO₃SCH₂, O, N-CH₂CH₃, OH | H₂N, SO₃H, HO₃S, NH₂ | Cl, N, N, Cl, N, Cl | H₂N–(phenyl)–benzthiazole–CH₃, SO₃H |
| 9 | CH₃, NC, O, N-CH₂CH₃, OH | H₂N, NH₂, SO₃H | Cl, N, N, Cl, N, Cl | H₂N–(phenyl)–benzthiazole–CH₃, SO₃H |
| 10 | CH₃, H₂N-C(=O), HO, N, OH | H₂N, NH₂, SO₃H | Cl, N, N, Cl, N, Cl | H₂N–(phenyl)–benzthiazole–CH₃, SO₃H |
| 11 | CH₃, HO₃S–CH₂, O, N-CH₂CH₂SO₃H, OH | H₂N, NH₂, SO₃H | Cl, N, N, Cl, N, Cl | H₂N–(phenyl)–benzthiazole–CH₃ |
| 12 | CH₃, H₂N-C(=O), O, N-CH₂CH₃, OH | H₂N, NH₂, HO₃S, SO₃H | Cl, N, N, Cl, N, Cl | H₂N–(phenyl)–benzthiazole–CH₃, SO₃H |

-continued

| No. | Coupling component | Diazo component | Halotriazine | Aminophenylbenzthiazole |
|---|---|---|---|---|
| 13 | (pyridone with CH₃, C(O)NH₂, HO₃S-CH₂, OH, N-CH₂CH₃) | 1,3-diamino-4-sulfobenzene | 2,4,6-trichloro-1,3,5-triazine | 2-(4-aminophenyl)-6-methyl-7-sulfobenzthiazole |
| 14 | (pyridone with CH₃, OH, N-CH₂CH₃) | 1,3-diamino-4-sulfobenzene | 2,4,6-trichloro-1,3,5-triazine | 2-(4-aminophenyl)-6-methyl-7-sulfobenzthiazole |
| 15 | (pyridone with CH₃, H₂N-C(O), OH, N-CH₂CH₃) | 1,3-diamino-4-sulfobenzene | 2,4,6-trichloro-1,3,5-triazine | 2-(4-amino-3-sulfophenyl)-6-methylbenzthiazole |
| 16 | (pyridone with CH₃, HO₃S-CH₂, OH, N-CH₃) | 1,4-diamino-2-sulfobenzene | 2,4,6-trifluoro-1,3,5-triazine | 2-(4-aminophenyl)-6-methyl-7-sulfobenzthiazole |
| 17 | (pyridone with CH₃, NC, OH, N-CH₂CH₃) | 1,4-diamino-2-sulfobenzene | 2,4,6-trichloro-1,3,5-triazine | 2-(4-amino-3-sulfophenyl)-6-methyl-7-sulfobenzthiazole |
| 18 | (pyridone with CH₃, HO₃SCH₂, HO, OH, N) | 1,3-diamino-4-sulfobenzene | 2,4,6-trichloro-1,3,5-triazine | 2-(4-aminophenyl)-6-methyl-7-sulfobenzthiazole |
| 19 | (pyridone with CH₃, NC, OH, N-CH₃) | 1,3-diamino-4-sulfobenzene | 2,4,6-trifluoro-1,3,5-triazine | 2-(4-aminophenyl)-6-methyl-7-sulfobenzthiazole |

-continued

| No. | Coupling component | Diazo component | Halotriazine | Aminophenylbenzthiazole |
|---|---|---|---|---|
| 20 | pyridone with CH3, CONH2, O, OH, N-CH2CH3 | 2,4-diaminobenzenesulfonic acid (H2N, SO3H, NH2) | 2,4,6-trichloro-1,3,5-triazine | 2-(4-aminophenyl)-6-methylbenzothiazole-7-sulfonic acid |
| 21 | pyridone with CH3, CONH2, HO3S-CH2, OH, O, N-CH2CH3 | 2,4-diaminobenzenesulfonic acid | 2,4,6-trichloro-1,3,5-triazine | 2-(4-aminophenyl)-6-methylbenzothiazole-7-sulfonic acid |
| 22 | pyridone with CH3, CONH2, O, OH, N-CH2CH2SO3H | 2,4-diaminobenzenesulfonic acid | 2,4,6-trifluoro-1,3,5-triazine | 2-(4-aminophenyl)-6-methylbenzothiazole-7-sulfonic acid |
| 23 | pyridone with CH3, CONH2, O, OH, N-CH2CH3 | 2,4-diamino-1,5-benzenedisulfonic acid | 2,4,6-trichloro-1,3,5-triazine | 2-(4-aminophenyl)-6-methylbenzothiazole |
| 24 | pyridone with CH3, HO3SCH2, O, OH, N-CH3 | 2,4-diaminobenzenesulfonic acid | 2,4,6-trichloro-1,3,5-triazine | 2-(4-aminophenyl)-6-methylbenzothiazole-7-sulfonic acid |
| 25 | pyridone with CH3, CONH2, O, OH, N-CH3 | 2,4-diaminobenzenesulfonic acid | 2,4,6-trichloro-1,3,5-triazine | 2-(4-aminophenyl)-6-methylbenzothiazole-7-sulfonic acid |
| 26 | pyridone with CH3, CONH2, HO3S-CH2, O, OH, N-CH2CH3 | 2,4-diamino-1,5-benzenedisulfonic acid | 2,4,6-trichloro-1,3,5-triazine | 2-(4-aminophenyl)-6-methylbenzothiazole |

| No. | Coupling component | Diazo component | Halotriazine | Aminophenylbenzthiazole |
|---|---|---|---|---|
| 27 | [structure: CH₃, H₂NC(O), O, N-CH₂CH₃, OH] | [structure: H₂N—benzene—NH₂ with HO₃S and SO₃H] | [triazine with 3 F] | [H₂N—benzthiazole—CH₃] |
| 28 | [structure: CH₃, H₂N-C(O), O, N-CH₂CH₃, OH] | [structure: H₂N—benzene—NH₂ with HO₃S and SO₃H] | [triazine with 3 Cl] | [H₂N—benzthiazole with HO₃S, SO₃H, CH₃] |
| 29 | [structure: CH₃, H₂N-C(O), O, N-CH₂CH₃, OH] | [structure: H₂N—benzene—NH₂ with SO₃H] | [triazine with 3 F] | [H₂N—benzthiazole with HO₃S, CH₃] |

DYEING PROCEDURE 1

2 parts of the dye obtained in Example 1 are dissolved at 20° to 50° C. in 100 parts of water with the addition of 5 to 20 parts of urea and 2 parts of calcined sodium carbonate. A cotton fabric is impregnated with this solution to a pick-up of 60 to 80% and then dried. The fabric is then thermofixed by ½ to 5 minutes at 140° to 210° C., subsequently soaped for a quarter of an hour in a 0.1% boiling solution of a non-ionic detergent, rinsed and dried.

DYEING PROCEDURE 2

2 parts of the dye obtained in Example 1 are dissolved at 75°-80° C. in 2000 parts of water with the addition of 120 parts of sodium chloride or calcined Glauber's salt. Then 100 parts of a cotton fabric are put into this dyebath and the temperature is kept constant for 30 to 60 minutes. Then 10 parts of calcined sodium carbonate and 4 ml of sodium hydroxide solution (36° Bé) are added. The temperature is kept for a further 45 to 60 minutes at 75° to 80° C. and the fabric is then soaped for 15 minutes in a 0.1% boiling solution of a non-ionic detergent, rinsed and dried.

DYEING PROCEDURE 3

2 parts of the dye obtained in Example 1 are dissolved in 100 parts of water while adding 0.5 part of sodium m-nitrobenzenesulfonate. A cotton fabric is impregnated with this solution to a liquor pick-up of 75% and then dried.

The fabric is then impregnated with a solution of 20° C. which contains 12 g/l of sodium hydroxide and 300 g/l of sodium chloride, and then expressed to a pick-up of 75%. The dyeing is steamed for 30 to 60 seconds at 100° to 101° C., rinsed, soaped for a quarter of an hour in a 0.3% boiling solution of a non-ionic detergent, rinsed and dried.

DYEING PROCEDURE 4

2 parts of the dye obtained in Example 4 of the Table are dissolved in 100 parts of water. The solution is added to 1900 parts of cold water, 60 parts of sodium chloride are added and 100 parts of a cotton fabric are put into this dyebath. The temperature is raised to 60° C. and 40 parts of calcined sodium carbonate and another 60 parts of sodium chloride are added after 30 minutes. The temperature is kept for 30 minutes at 60° C. The dyeing is rinsed and then soaped for 15 minutes in a 0.3% boiling solution of a non-ionic detergent, rinsed and dried.

PRINTING PROCEDURE 2 parts of the dye obtained according to Example 1 are sprinkled, with rapid stirring, into 100 parts of a stock thickening which contains 45 parts of 5% sodium alginate thickening, 32 parts of water, 20 parts of urea, 1 part of sodium m-nitrobenzenesulfonate and 2 parts of sodium carbonate.

A cotton fabric is printed with the printing paste so obtained on a roller printing machine. The printed fabric is steamed 4 to 8 minutes at 102°-104° C. in saturated steam, then thoroughly rinsed in cold and hot water, in the process of which chemically nonfixed dye can be very easily removed from the fabric, and then dried.

What is claimed is:

1. A reactive dye of the formula

5. A reactive dye of claim 4, wherein $R_3$ is carbamoyl.
6. A reactive dye of claim 3, wherein $R_3$ is carbamoyl.
7. A reactive dye of claim 6, of the formula

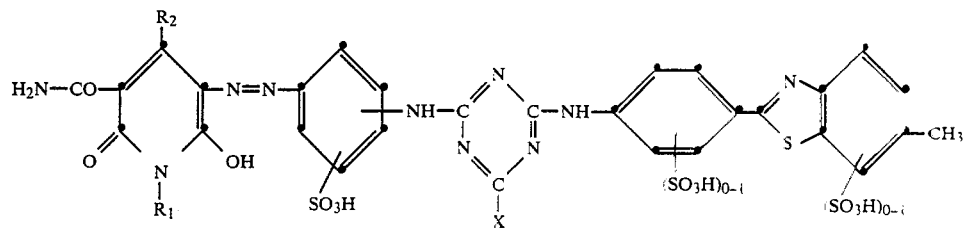

wherein $R_1$ is hydrogen or $C_1$-$C_4$alkyl, $R_2$ is $C_1$-$C_4$alkyl, and X is fluorine, chlorine or bromine.

8. A process for the preparation of a reactive dye of claim 1, which comprises reacting in any order, a 6-hydroxypyrid-2-one of the formula

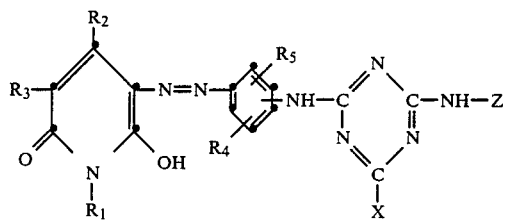

wherein $R_1$ is hydrogen or unsubstituted or substituted $C_1$-$C_4$alkyl or phenyl, $R_2$ is hydrogen or unsubstituted or substituted $C_1$-$C_4$alkyl, $R_3$ is hydrogen, cyano, carbamoyl or sulfomethyl, $R_4$ and $R_5$ are each independently hydrogen, $C_1$-$C_4$alkyl, $C_1$-$C_4$alkoxy, halogen, carboxy or sulfo, X is fluorine, chlorine or bromine, and Z is an unsubstituted or substituted benzthiazolyl-(2)-phenyl radical.

2. A reactive dye of claim 1, of the formula

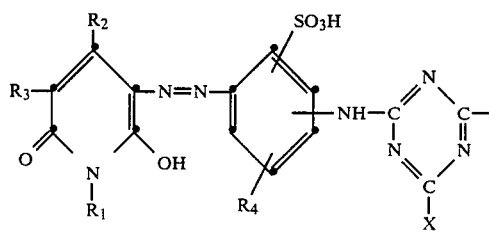

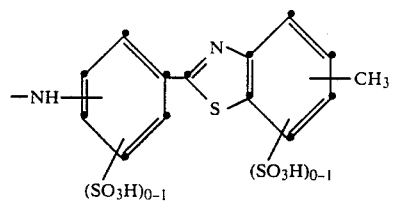

wherein $R_4$ is hydrogen, methyl, methoxy, chlorine or sulfo.

3. A reactive dye of claim 2, wherein $R_1$ is hydrogen or unsubstituted or substituted $C_1$-$C_4$alkyl and $R_2$ is $C_1$-$C_4$alkyl.

4. A reactive dye of claim 3, wherein $R_1$ is hydrogen, methyl, ethyl or sulfoethyl and $R_2$ is methyl.

wherein W is hydrogen or carbamoyl, a diaminobenzene of the formula

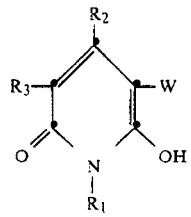

a 2,4,6-trihalo-s-triazine of the formula

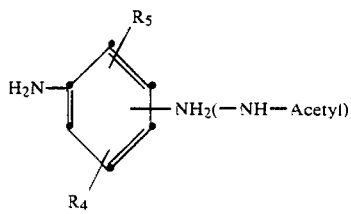

and a benzthiazolyl-(2)-phenylamine of the formula $H_2N-Z$ by diazotization, coupling and condensation.

9. A reactive dye of claim 7 of the formula

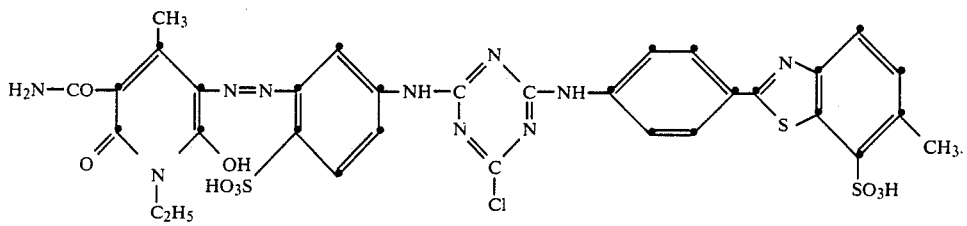

10. A process of dyeing or printing a substrate of cellulose, natural polyamide or synthetic polyamide, comprising the step of applying to the substrate a dye of the formula

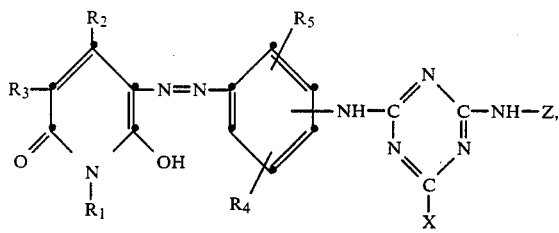

wherein $R_1$ is hydrogen or unsubstituted or substituted $C_1$–$C_4$alkyl or phenyl, $R_2$ is hydrogen or unsubstituted or substituted $C_1$–$C_4$alkyl, $R_3$ is hydrogen, cyano, carbamoyl or sulfomethyl, $R_4$ and $R_5$ are each independently hydrogen, $C_1$–$C_4$alkyl, $C_1$–$C_4$alkoxy, halogen, carboxy or sulfo, X is fluorine, chlorine or bromine, and Z is an unsubstituted or substituted benzthiazolyl-(2)-phenyl radical.

11. The process of claim 10 wherein the dye is applied to cellulose fibers by dyeing.

12. A process of claim 8, comprising the steps of diazotising 1-amino-3-acetylaminobenzene-6-sulfonic acid and coupling the diazonium compound to 1-ethyl-4-methyl-5-carbamoyl-6-hydroxyprid-2-one, removing the acetyl group by sapnification, condensing the aminomonoazo compound so obtained with cyanuric chloride, and condensing the primary condensation product so obtained with dehydrothio-p-toluidine-7-sulfonic acid to obtain the reactive dye of the formula

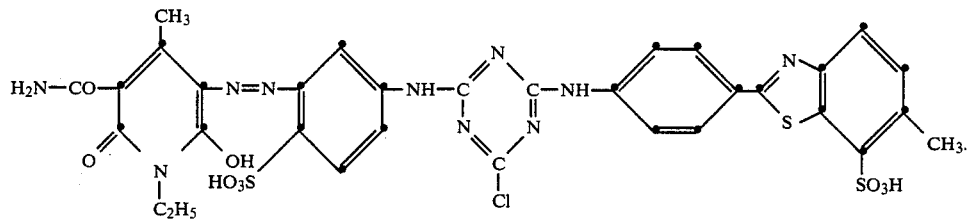

13. A process of claim 8, comprising the steps of diazotising 1-amino-3-acetylaminobenzene-6-sulfonic acid and coupling the diazonium compound to 1-ethyl-4-methyl-5-carbamoyl-6-hydroxypyrid-2-one, removing the acetyl group by saponification, and also condensing cyanuric chloride with dehydrothio-p-toluidine-7-sulfonic acid and condensing both intermediates with each other to obtain the reactive dye of the formula

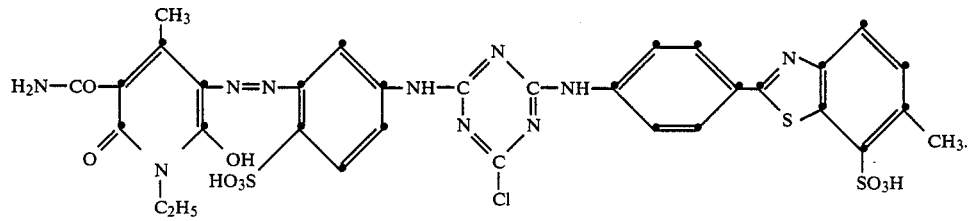

* * * * *